Reissued May 12, 1942

Re. 22,097

UNITED STATES PATENT OFFICE 22,097

TREATMENT OF CATALYSTS

Bryan D. Wells, Chicago, Ill., assignor to Universal Oil Products Company, Chicago, Ill., a corporation of Delaware No Drawing. Original No. 2,225,811, dated December 24, 1940, Serial No. 238,065, October 31, 1938. Application for reissue August 4, 1941, Serial No. 405,410

8 Claims. (Cl. 252—243)

This invention relates particularly to the treatment of spent metal catalysts which have become fouled by the deposition of carbonaceous materials and the formation of sulfides during their use in hydrocarbon conversion reactions involving petroleum fractions which contain appreciable amounts of sulfur.

The invention is more particularly directed to the reactivation of spent nickel catalysts so that their original catalytic activity in promoting hydrogenation reactions is sufficiently restored to warrant their further utilization. It is still more specifically directed to reactivation of spent hydrogenation catalysts composed of a relatively inert support upon which nickel has been deposited by reduction of oxides which in turn have been produced by the calcination of such compounds as nickel hydroxide, nickel nitrate, nickel carbonate, etc.

During the course of hydrogenation reactions, small but definite amounts of heavy carbonaceous materials are formed and these deposits upon the surface and in the pores of the active catalytic metals while any sulfur present in the materials undergoing reaction combines with the metal catalysts to form sulfides which further coat and impair their activity. These poisoning reactions are more generally in evidence, the greater the activity of the catalyst and consequently are very noticeable in connection with reduced nickel catalysts since nickel has a very high catalytic activity in all types of hydrocarbon conversion reactions and is used to a large extent commercially in processes involving the hydrogenation of unsaturated hydrocarbons, such as, for example, the octenes produced by the polymerization of butenes in petroleum refining processes.

In one specific embodiment the present invention comprises a process for reactivation of spent metal and particularly nickel catalysts involving the following series of steps: (1) steaming at moderate temperatures to remove volatile organic matter; (2) oxidation of residual carbonaceous deposits to carbon oxides and water and of nickel sulfide to nickel sulfate by the application of moist air or oxygen; (3) precipitation of nickel hydroxides from nickel sulfate in situ by the use of dilute aqueous alkalis such as ammonium hydroxide of caustic soda; (4) washing to remove sulfates; (5) drying and reducing with hydrogen to generate nickel.

Step 1 of the process is employed to remove substantially all adhering materials which can be volatilized by steam so that less load is placed on the second and third steps. Superheated steam is preferably employed and temperatures within the approximate range of 250–500° F. may be used depending upon the type of material to be volatilized.

In the second step, the temperature employed will be dependent upon the amount of sulfur present as sulfide and may vary from approximately 400 to 800° F. Treatment is continued until substantially all of the carbonaceous material has been burned off, which can be determined by tests on samples drawn from the catalyst bed. At the end of the second step, no compound of nickel should be present except oxides and sulfate, the former being in predominating amounts.

Prior to the third step of the process, the catalyst bed is cooled and treated with dilute aqueous solutions of alkalis such as the hydroxides of the alkali metals and/or ammonia to precipitate nickel hydroxide and form water soluble sulfates. As will be shown in a later example, weak alkalis are first applied, the solutions drained and the mass dried with air after which stronger alkalis are applied to complete the precipitation of nickel hydroxide.

The fourth step consists in careful water washing at ordinary temperatures to remove traces of soluble sulfates, and in the fifth step, the catalyst mass is dried by passing a stream of hot inert gases thereover, and finally reduced with hydrogen at a moderate temperature usually within the range of 500–800° F.

The present process is principally applicable to composite catalysts comprising relatively inert materials supporting reduced metals and has been found highly advantageous in the reactivation of catalysts consisting of nickel or nickel and copper supported on kieselguhr, these catalysts having been made by pelleting kieselguhr and hydrated nickel carbonate, using lubricants such as graphite in the pilling operation and reducing directly with hydrogen at temperatures of the order of 500–800° F. These catalysts are highly active in hydrogenating olefinic hydrocarbons to produce their saturated counterparts.

The operations of the process are of a relatively simple character and enable the complete restoration of the catalytic properties of composite hydrogenating catalysts. The only reagents necessary are steam, air, aqueous alkalis, hydrogen and wash water, and in the case of composite catalysts which have been employed in chambers of multi-tubular elements in hydrogenating reactions, the catalytic activity can be completely restored without removing the catalysts from their containers. It is particularly to be noted that the present process assures complete removal of all deleterious substances and substantially complete reactivation of catalytic properties without loss of material.

The following example is given to show the type of results normally obtainable in the practice of the process although not with the intention of imposing exactly corresponding limitations upon the invention's proper scope.

A spent catalysts bed of ⅛'' x ⅛'' pellets consisting originally of kieselguhr, graphite, and nickel was first steamed for one hour at a temperature of 400° F. to remove adhering oils and other volatilizable materials. Following the passage of the steam, a mixture consisting of 94% nitrogen and 6% air was passed through the catalyst bed at a temperature of 400° F. for a period of three hours. At this time the temperature was raised to 450° F. and the air was increased to 11% of the mixture. These conditions were maintained for one hour after which the temperature was again raised to 550° F. and maintained at that temperature for four hours. The temperature was then decreased to 500° F. and the percentage of air in the gas mixture increased to approximately 15%. These last conditions were maintained for three hours after which the heating was stopped and the material allowed to cool to 180° F. with the same gas mixture flowing over the catalyst.

When the catalyst temperature had fallen to 180° F., the pellets were wetted with an approximately 3% ammonium hydoxide solution, after which the excess solution was drained off and air was blown through the wet material at an increasing rate for four hours. The catalyst bed was again wetted with approximately 10% ammonium hydroxide solution and a larger amount of 1% solution was pumped through during a period of approximately 1 hour. After this time a distilled water wash was substituted and the washing continued until no test for sulfates was obtained in the effluent. The catalyst bed was then dried by passing therethrough a stream of nitrogen heated to 220° F. and reduction of nickel oxides was brought about by contacting with a stream of hydrogen at temperatures from 500 to 700° F. over a period of four hours.

Considering activities on a basis of ability to hydrogenate a mixture of octenes under a given set of conditions of temperature, pressure, and hydrogen concentration, the activity of the spent catalyst prior to the above treatment had been reduced to 20% of its original value calculated on the basis of the saturation produced in the mixture of octenes. After the reactivating treatment, it was found that the catalytic activity had been increased to 100% of the original value.

I claim as my invention:

1. A process for regenerating spent metal catalysts in which the metal is present in the sulfide form, which comprises subjecting the spent catalyst to oxidation by means of an oxygen-containing gas to convert the metal sulfide to sulfate, then treating the catalyst with aqueous alkali solution to precipitate metal hydroxide from the sulfate, and subsequently reducing with hydrogen to form free metal.

2. A process for regenerating spent metal catalysts in which the metal is present in the sulfide form, which comprises subjecting the spent catalyst to the action of air at a temperature of from 400 to 800° F. to convert the metal sulfide to sulfate, then treating the catalyst with aqueous alkali solution to precipitate metal hydroxide from the sulfate, and subsequently reducing with hydrogen at a temperature of from 500 to 800° F. to form free metal.

3. A process for regenerating spent nickel catalysts in which the nickel is present in the sulfide form, which comprises subjecting the spent catalyst to oxidation by means of an oxygen-containing gas to convert the nickel sulfide to sulfate, then treating the catalyst with aqueous alkali solution to precipitate nickel hydroxide from the sulfate, and subsequently reducing with hydrogen to form free nickel.

4. A process for regenerating spent nickel catalysts in which the nickel is present in the sulfide form, which comprises subjecting the spent catalyst to the action of air at a temperature of from 400 to 800° F., to convert the nickel sulfide to sulfate, then treating the catalyst with aqueous alkali solution to precipitate nickel hydroxide from the sulfate, and subsequently reducing with hydrogen at a temperature of from 500 to 800° F. to form free nickel.

5. A process for regenerating a spent metal catalyst in which a portion of the metal is present in a sulfurized condition which comprises subjecting the spent catalyst to the action of air at a temperature of from about 400 to about 800° F. to convert a portion of the sulfurized metal to metal sulfate, cooling to about 180° F., wetting the catalyst with a weak aqueous alkali and further subjecting the wetted catalyst to the action of air to convert a further substantial portion of the sulfurized metal to sulfate, treating the catalyst with a further quantity of an aqueous alkali solution to precipitate metal hydroxide from the sulfate, washing to remove sulfate ions and subsequently reducing with hydrogen at a temperature of from about 500 to about 800° F. to form free metal.

6. A process for regenerating a spent nickel catalyst in which a portion of the nickel is present in a sulfurized condition which comprises subjecting the spent catalyst to the action of air at a temperature of from about 400 to about 800° F. to convert a portion of the sulfurized nickel to nickel sulfate, cooling to about 180° F., wetting the catalyst with a weak aqueous alkali and further subjecting the wetted catalyst to the action of air to convert a further substantial portion of the sulfurized nickel to sulfate, treating the catalyst with a further quantity of an aqueous alkali solution to precipitate nickel hydroxide from the sulfate and subsequently washing to remove sulfate ions and reducing with hydrogen at a temperature of from about 500 to about 800° F. to form free nickel.

7. A process for regenerating a spent sulfurized metal catalyst which comprises subjecting said catalyst to the action of air at a temperature of from about 400 to about 800° F., cooling the catalyst to a temperature of about 180° F., wetting the catalyst with an aqueous alkali and further subjecting the wetted catalyst to the action of air, treating the catalyst with a further quantity of aqueous alkali solution, washing the catalyst with water, drying and treating with hydrogen at a temperature of from about 500 to about 800° F.

8. A process for regenerating a spent sulfurized nickel catalyst which comprises subjecting said catalyst to the action of air at a temperature of from about 400 to about 800° F., cooling the catalyst to a temperature of about 180° F., wetting the catalyst with an aqueous alkali and further subjecting the wetted catalyst to the action of air, treating the catalyst with a further quantity of aqueous alkali solution, washing the catalyst with water, drying and treating with hydrogen at a temperature of from about 500 to about 800° F.

BRYAN D. WELLS.